(No Model.)

W. KAISER.
VALVE FOR WATER PIPES.

No. 252,951. Patented Jan. 31, 1882.

Witnesses:
W. L. Langley.
A. E. Eader.

Inventor:
William Kaiser
By his Atty
Chas. B. Mann

UNITED STATES PATENT OFFICE.

WILLIAM KAISER, OF WILKES-BARRÉ, PENNSYLVANIA.

VALVE FOR WATER-PIPES.

SPECIFICATION forming part of Letters Patent No. 252,951, dated January 31, 1882.

Application filed July 13, 1881. (No model.)

*To all whom it may concern:*

Be it known that I, WILLIAM KAISER, a citizen of the United States of America, residing at Wilkes-Barré, in the county of Luzerne and State of Pennsylvania, have invented certain new and useful Improvements in Valves for Water-Pipes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in valves of flushing supply-pipes for water-closets, urinals, &c., and will first be described, and then designated in the claims.

The object of the invention is to combine in a water-valve such parts and construction as will serve the double purpose of, first, a valve by which the water may be let on, and, second, a self-acting check-valve, by which, should the valve-handle be drawn out to open the valve at a time when the main supply is temporarily turned off, (as when repairs are being made,) filth or foul gases will be prevented from entering back into the supply-pipe.

Figure 1:
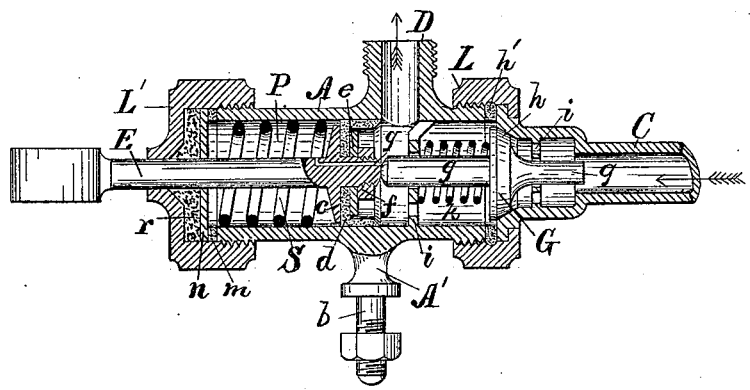
Figure 2:
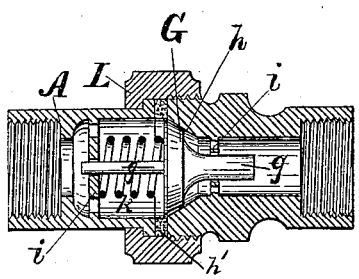
Figure 3:
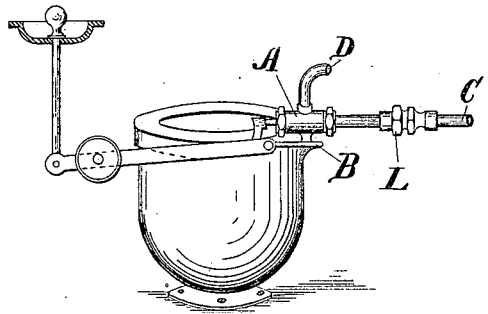

In the drawings hereto annexed, Figure 1 is a section of the improved parts combined in a valve. Fig. 2 is a section of the self-acting check-valve separately adapted for use with the ordinary flushing valve or cock as heretofore constructed. Fig. 3 shows the check-valve applied to the supply-pipe of a water-closet.

As shown in Fig. 1, the valve-case A is designed to be supported by the shank A', whose end *b* enters a hole in the shelf B, attached to the water-closet.

C designates the supply-pipe; D, the pipe from which is discharged the flushing-water, and E the stem at the end of which the drawing mechanism is attached.

The check-valve G closes against a seat, *h*, and the said valve is provided with slide-stems *g* on each side, which have bearings in the two perforated diaphragms *i*, by which means the valve may be moved to or from its seat. A spiral spring, *k*, surrounds one of the stems, and bears against one of the diaphragms and the valve, serving to keep the valve normally to its seat. The case of the check-valve is made in two parts, the separation or joinder of which is at a point between the two diaphragms. A washer, *h'*, is provided to make the joint tight, and a screw-coupling, L, to secure the two parts together. This valve is designed to close against the flow of water, as indicated by arrows in the drawings, the tension of the spring *k* exerting pressure sufficient to keep the valve closed when the water is turned off in the supply-pipe C. When this valve is open the water passes through the first diaphragm, next past the valve, and then through the second diaphragm into the discharge-pipe D.

The stem E, by drawing which the valve is opened, carries a disk or head, *c*, on one side of which a cup-washer, *d*, is secured by a plate or disk, *e*, held tightly against the washer by a nut, *f*, on the threaded end of the stem. The washer closely fits the barrel or cylinder of the valve-case A, and the end of the latter is closed by a cap, L', and made tight by a washer, *m*, and plate *n*. A chamber, P, is thus formed in the valve-case, and a small duct or passage, *q*, in the end of the stem leads from the chamber to the discharge-pipe D. A suitable packing, *r*, around the stem and within the cap L' makes the said connection water-tight. A spiral spring, S, surrounds the valve stem and bears against the plate *n* or washer *m* in the end of the chamber and the head *c* of the stem, and this spring exerts a pressure sufficient to overcome the pressure of the water. It will be noticed this is effected by the end of the stem E abutting against the end of the check-valve stem *g* and holding the said valve to its seat against the pressure of the water.

The operation of the valve is as follows: The chamber P stands full of water, and upon the stem E being drawn out the water is expelled through the duct *q* and around the circumference of the cup-washer *d*, and the spring S is compressed. By thus withdrawing the stem E from contact with the stem *g* of the check-valve the pressure of the water in the supply-pipe forces the check-valve away from its seat, and the flow of water through the valve and out at the discharge-pipe is at once established. Now, upon releasing the pull or draft on the stem E, the spring S will exert such pressure as will, by pressing this stem against the check-valve stem, close the latter to its seat against the flow of water. Instead of the spring S, a weighted lever may be employed to exert the requisite pressure against the valve. The movement of the stem E, when closing, is retarded by the fact that it will only move as fast as the chamber P can be filled by water flowing through the small duct $q$, which prevents the sudden closing of the valve, and thereby allows enough water to flow into the soil-pan to seal it. Thus it will be seen the device is effective as a mere valve for letting on and shutting off the water; and should the stem E be pulled out at any time when the main supply is shut off from the supply-pipe C, the check-valve will not leave its seat, since it is held thereto by the spring $k$, and thus the check-valve serves to prevent filth or foul gases from entering the supply-pipe. This latter result is of great importance, as by the ordinary flushing valves and cocks now employed the whole system of water-pipes in a house is liable to be contaminated upon the opening of the valve, when the main supply is cut off, by the back-flow of filth or the entry of foul gases which may be at or near their mouths.

The foregoing description relates to the combination of the check-valve with an ordinary water-closet valve. The check-valve is just as effective when connected to the supply-pipe and used in combination with an ordinary flushing-cock attached to a water-closet, as shown in Fig. 3.

Having described my invention, I claim and desire to secure by Letters Patent of the United States—

1. The combination of a valve which closes against the flow of the liquid, means to hold the valve normally to its seat, except when the pressure of liquid is on, and an independently-movable stem, which abuts against the valve and is adapted to hold it rigidly to its seat, as set forth.

2. The combination of a valve which closes against the flow of the liquid, means to hold the valve normally to its seat, except when the pressure of liquid is on, an independently-movable stem, which abuts against the valve, and means to exert sufficient pressure to close the valve to its seat against the flow of water, as set forth.

3. In a water-closet or urinal, the combination of a water-supply valve and a check-valve detached therefrom, which closes to its seat against the flow of water, and is opened solely by the current when the supply-valve is opened, whereby, if there is no current in the main supply-pipe, the check-valve will remain closed upon opening the supply-valve and prevent back-flow into the main pipe of soiled water or filth, as set forth.

In testimony whereof I affix my signature in presence of two witnesses.

WILLIAM KAISER.

Witnesses:
JOHN ZEIS,
FREDERICK THEIS, Jr.